May 9, 1961   B. T. HENSGEN ET AL   2,983,614
METHOD AND APPARATUS FOR FORMING CHEESE SLICES
Filed Dec. 1, 1958

BERNARD T. HENSGEN
RALPH M. FAUST
INVENTORS

BY R. G. Story
Attorney

United States Patent Office 2,983,614
Patented May 9, 1961

2,983,614

METHOD AND APPARATUS FOR FORMING CHEESE SLICES

Bernard T. Hensgen, Chicago, and Ralph M. Faust, Berwyn, Ill., assignors to Swift & Company, Chicago, Ill., a corporation of Illinois Filed Dec. 1, 1958, Ser. No. 777,335

9 Claims. (Cl. 99—115)

This invention relates in general to the manufacture of cheese slices and, more particularly, to a method and apparatus whereby cheese is formed into a continuous ribbon severable into individual units.

It is the usual practice to package cheese products for the consumer market in groups of individual slices. In the past the cheese product has usually been molded as a relatively large unit, such as a wheel or loaf, and then severed into individual slices for packaging. Also, continuous sheets of cheese product have been produced and later divided into smaller slice-size units. The latter method is carried out with large and expensive apparatus comprising a pair of cooperating surfaces, such as rotating drums, which press out a broad sheet of cheese suitable for further processing and division into the smaller units. Further, individual slice-size units of cheese have been produced with relatively complicated devices having individual molds. It may be readily appreciated that the foregoing methods require either heavy, complicated, and expensive machinery or result in excessively large units of product requiring extensive further handling.

Therefore, it is an object of this invention to provide a method and apparatus for producing cheese slices in an economical and rapid operation.

An additional object of this invention is to employ centrifugal forces for forming a continuous ribbon of cheese which may subsequently be divided into smaller consumer-size slice units.

Another object of this invention is to provide a system for spinning a body of flowable cheese in a vessel and separating a portion of the cheese as it escapes the spinning vessel to form a ribbon divisible into slice-size units.

One embodiment of the invention has been illustrated in the accompanying drawings; but it is to be expressly understood that said drawings are for the purpose of illustration only and are not to be taken as a definition of the limits of the invention, reference being had to the appended claims for this purpose. In said drawings:

Figure 1:
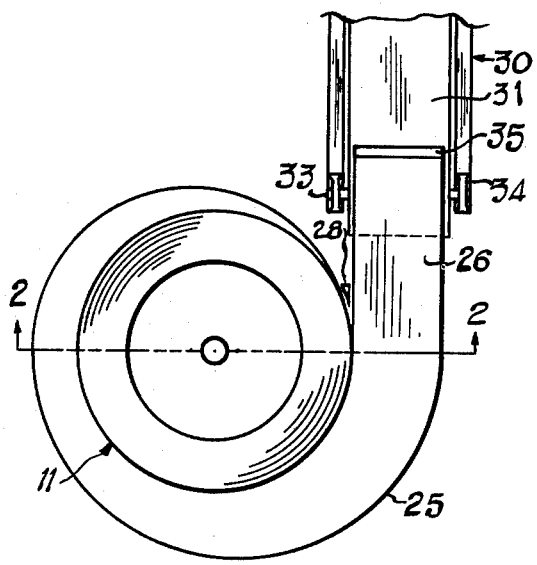
Figure 1 is a plan view of the appartus including a centrifuge and a cheese ribbon take-off conveyor.

Fundamentally the method contemplates spinning a body of flowable cheese product at a temperature elevated above that at which the material will set up into a rigid or semirigid mass, whereby the cheese will be urged outwardly from the center of rotation by centrifugal force. During the spinning operation the cheese is confined within a zone whereby increments of the material are subjected to both centrifugal and gravitational forces so that the vertical dimension thereof will be reduced as it is urged further from the center of rotation. Therefore, the cheese product will spread into a relatively thin circular mass; and at a selected point spaced from the center of rotation a peripheral portion of the material is separated from the rotating mass. Thus a ribbon of cheese product will be produced and may be continuously conveyed from the rotating mass for further processing such as severing into units of a prescribed size. The entire operation may be made continuous by constantly adding additional material, at the original elevated temperature, equal to the rate at which material is removed from the rotating mass.

Novel apparatus has been devised to carry out the above method, comprising a rotatable vessel or centrifuge having a sloping peripheral wall, separating means located adjacent the lip of the vessel, and a take-off conveyor for carrying away a ribbon of cheese product.

Referring to the drawings, the centrifuge generally 10 comprises an open vessel 11 having a bottom portion 12, a lower peripheral wall 13, and upper peripheral wall 14 rotatably supported within a frame 15. The top edge of the upper wall 14 forms a lip 16 for the vessel 11. One end of a supply pipe 17 is suspended within the vessel 11 for delivering flowable cheese from a heated supply of molten cheese product (not shown). Any suitable power means, such as a variable speed electric motor 20, may be provided to drive the centrifuge through suitable gearing 21 connected to a shaft 22 attached to the bottom 12 of vessel 11.

The interior surface of the vessel 11 should possess a low coefficient of friction, be nontoxic, and easily cleaned. Such a surface may be obtained where the interior of the vessel is made of Teflon, polished chrome, stainless steel, or the like.

It will be understood that it is desirable to obtain a high degree of compaction in the material being processed. To achieve this compaction the walls of the vessel are sloped from the vertical at an angle which will require a rotational speed, for the escape of the material over lip 16, slightly in excess of the rotational speeds necessary to achieve the desired degree of compaction. The lower peripheral wall 13 is sloped to fulfill this requirement. However, as will become obvious in the following discussion, the cheese being handled will normally lose heat and tend to set up into a semirigid condition as it creeps up the wall of vessel 11. As the cheese sets up, the flow characteristics will obviously change with the result that a greater component of the centrifugal force will be necessary to enable the cheese to creep up a given slope against the drag caused by gravity, adhesion between the cheese and vessel, and the viscosity of the cheese itself. For this reason, the upper peripheral wall 14 is sloped from the vertical at a greater angle than the lower peripheral wall 13. In this way the total centrifugal forces necessary for the cheese to overcome the drag, and thus escape the vessel 11, across the upper peripheral wall 14, will be lowered and the material will continue to move out of the vessel across lip 16 as it cools.

Under certain operating conditions, it may be found that the cheese product will tend to set up too fast. This, of course, will depend to a great extent upon the exact composition of the cheese product being processed and the ambient temperature in the workroom. Also, of course, the shape, size, and material of the vessel 11 and the quantity of cheese being processed therein at any given instant, and its temperature, will affect the setting up of the material. Therefore, under some conditions it may be desirable to jacket the centrifuge 10 in a convenient manner to provide a control over the temperature of the walls of vessel 11 and thereby control the point at which the material will set up.

Figure 2:
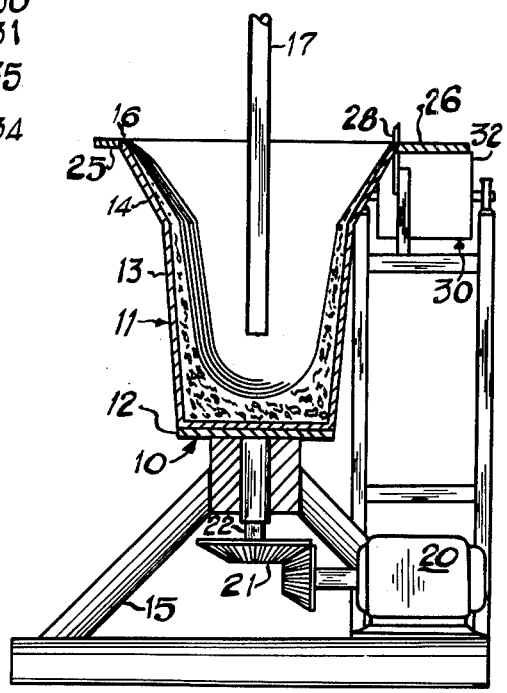
Figure 2 is a sectional elevation view of the apparatus taken at line 2—2 of Figure 1.
Figure 3:
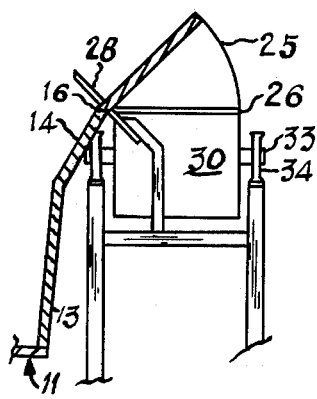
Figure 3 is a partial section of a modification of the apparatus of Figures 1 and 2.
Figure 4:
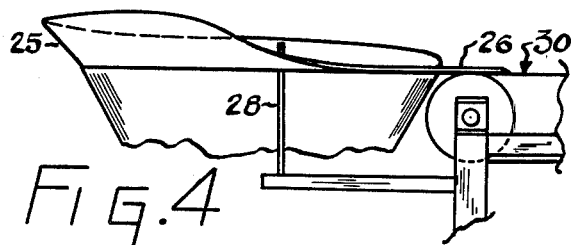
Figure 4 is a partial side elevation of the apparatus of Figure 3.

A stationary receiving surface 25 for supporting a portion of the cheese as it escapes the vessel is located concentric to and level with the lip 16 and extends around a major portion of the centrifuge. The outer edge of the receiver 25 spirals outwardly and, in some instances, upwardly away from the center of the centrifuge 10 with increasing distance between the lip 16 and the outer edge of the receiver 25 in the direction of rotation. The receiver 25 may be formed in a horizontal plane as shown in Figure 2 or at an inclined angle between the horizontal and a projection of the upper wall 14 of vessel 11 (Figures 3 and 4). The latter inclined receiver 25 may be found desirable where high speeds of rotation are necessary.

The stationary receiver 25 terminates in a horizontal section 26 essentially tangent and departing from the lip 16. Where the spiral portion of the receiver 25 is at an angle to the horizontal, as shown in Figure 3, the upper surface of the receiver 25 is bent to a horizontal plane at about the area departing from the circumference of the vessel 11.

A doctor blade 28 or other severing means is fixed between the receiver 25 and the vessel lip 16, at the point where the receiver departs from the lip 16, to peeel the peripheral portion of cheese on the receiver 25 from the mass in vessel 11. Preferably, the blade 28 is maintained perpendicular to the surface of the receiver 25.

A take-off conveyor generally 30 is located immediately beneath the horizontal section 26 of the receiver 25. The take-off conveyor 30 comprises an oil-impervious endless belt 31 trained about a pulley 32, beneath the receiver 25. Pulley 32 is rotatably supported upon a shaft 33 mounted in pillow bearings 34 on the frame 15. The upper surface of the free end of the receiver section 26 is tapered to allow a smooth transition of the ribbon of cheese product from the receiver to the conveyor belt 31. A suitable electric motor may be used to drive the take-off conveyor 30 at a speed essentially equal to, or slightly greater than, the speed of the midpoint of the ribbon at about the point where it is separated from the mass of material in the vessel 11.

In operation, cheese product is maintained in a flowable condition in a supply vat or the like and continuously delivered to vessel 11 through the supply pipe 17 at a rate equaling the rate of removal of cheese from vessel 11 in the form of a ribbon. The vessel is rotated at a speed sufficient to cause the cheese to creep up the inner surface of peripheral walls 13 and 14 and outwardly across the lip 16 on to the stationary receiver 25. Due to centrifugal force, each increment of cheese will continue to move outwardly from the center of rotation of the vessel 11 toward the outer edge of the receiver 25. Since the walls 13 and 14 of the vessel are inclined upwardly, the cheese must overcome gravitational forces when escaping vessel 11 and will compact and spread out as it creeps up the walls to form a relatively thin circular mass. During a single rotation of the vessel 11 the cheese will move from lip 16 across receiver 25 a desired distance equal to the width of, say, an ordinary cheese slice for sandwich making. At the point at which the cheese has moved the desired distance beyond lip 16, it is separated from the main body of cheese in the vessel 11. It will then be in the form of a thin ribbon tending to move tangent to the centrifuge 10. Preferably, the ribbon will be flat and relatively wide, that is, it will have the thickness and width of cheese slices normally sold to the home consumer market.

As the cheese flows upwardly along the walls of the centrifuge it will lose heat with a resultant decrease in temperature, causing the cheese to set up into a semirigid condition. Preferably, at some point on the upper peripheral wall 14 the cheese will be nearly set up in its finished condition with relatively firm glazed top and bottom surfaces. Since the upper wall 14 is sloped at a relatively greater angle to the vertical, the cheese will continue to move out of the vessel 11 to the conveyor 30 where it will be completely set up and may be handled further. For example, the cheese may be formed into a continuous roll by winding it upon a mandrel with a layer of paper between the convolutions of cheese. Alternately the ribbon may be severed, as it travels on the conveyor 30, into convenient slice lengths for consumer packaging.

Obviously various modifications may be made in the present apparatus and method without departing from the spirit of the invention. The size, speed, and shape of the centrifuge 10 may be varied to suit particular operating conditions. The invention may find application in fields, other than the manufacture of cheese slices, where it is desirable to form ribbons or slices of another plastic material. As has been discussed, the centrifuge 10 may be provided with a water or steam jacket or the like, where desired. Further, the separating means may take the form of the illustrated doctor blade 28 or some other element such as a wire or plow.

The foregoing description is for the purpose of complying with 35 U.S.C. 112 and we do not desire to be limited to the exact details shown and described, for obvious modifications will be apparent to those skilled in the art to which this most nearly appertains, and such modifications may be made without departing from the spirit of the invention.

We claim:

1. A method for forming a ribbon of cheese product comprising the steps of spinning a quantity of molten cheese in a flowable state whereby the material tends to move away from the center of rotation due to the centrifugal force in the form of a relatively thin circular mass, setting up said cheese by allowing it to cool to semirigid condition while spinning said mass, and peeling the outer peripheral portion of said material outwardly away from the body of said mass in the form of a ribbon.

2. A method for forming a continuous ribbon of cheese product comprising the steps of heating the cheese product to a flowable state, spinning a quantity of the flowable cheese whereby it tends to move away from the center of spin in the form of a thin circular mass, removing heat from said spinning mass to cause said cheese product to set up into a semirigid condition, separating a peripheral portion of said mass from the body of said mass in the form of a ribbon, and continuously adding said flowable cheese product to said mass at a rate equal to the rate at which said cheese is removed as a ribbon.

3. The method of claim 2 wherein the ribbon of cheese product is further divided into individual slice-size units.

4. Apparatus for forming a ribbon of cheese product comprising: a rotatable vessel having an open top for containing flowable cheese product, means to rotate said vessel whereby said cheese therein will tend to creep outwardly across the open top thereof, a stationary receiver concentric with the top of said vessel for supporting cheese creeping out of said vessel, severing means fixed between said vessel and said stationary receiver for separating a ribbon of said material from the mass within said vessel, and means to carry said ribbon from said stationary receiver.

5. Apparatus for forming a ribbon of cheese product comprising: a source of cheese product in a flowable condition, a rotatable vessel having an open top in the form of a circular lip and sloping side walls, a supply conduit connected to said source and emptying into said vessel, means to rotate said vessel whereby flowable material therein will tend to creep upwardly across the lip thereof, a stationary receiver concentric with the lip of said vessel for supporting cheese escaping from said vessel, severing means fixed between the lip and said stationary receiver for separating a ribbon of said material from the mass within said vessel, and means to carry said ribbon from said receiving means.

6. Apparatus for forming a ribbon of cheese product comprising: rotatable means for spinning a quantity of cheese into a thin circular mass, severing means adjacent said rotatable means, said severing means adapted to separate a continuous peripheral portion from said circular mass, and conveying means to carry the continuous peripheral portion away from said rotatable means.

7. Apparatus for forming a ribbon of cheese product comprising: a rotatable vessel having an open top for containing flowable cheese product, said cheese product tending to creep outwardly across the open top of said vessel when rotated, severing means located adjacent the top of said vessel for separating a continuous ribbon of said cheese from the mass within said vessel, and means located outwardly of said severing means from said vessel to carry said ribbon therefrom.

8. Apparatus for forming a ribbon of cheese product comprising: a rotatable vessel having an open top for containing flowable cheese product, said cheese product tending to creep outwardly across the open top of said vessel when rotated, a stationary receiver concentric with the top of said vessel for supporting cheese creeping out of said vessel, severing means fixed between said vessel and said stationary receiver for separating a continuous ribbon of said cheese material from the mass within said vessel, and means to carry said ribbon from said stationary receiver.

9. A method for forming a ribbon of cheese product comprising the steps of continuously charging flowable cheese product at an established rate to an open vessel, said vessel having a circular lip at the open extremity, spinning said vessel at a constant speed as said flowable cheese is charged thereto whereby the cheese will move from within the vessel outwardly across the lip thereof in the form of a relatively thin circular mass due to centrifugal force, setting up said cheese in a semirigid condition as it moves from within said vessel, peeling an outer peripheral ribbon of said thin circular mass outwardly from said vessel as said mass moves across said lip, and removing said ribbon tangentially from the lip of said vessel at said established rate.

References Cited in the file of this patent
UNITED STATES PATENTS

| | | |
|---|---|---|
| 2,352,210 | Kraft | June 27, 1944 |
| 2,387,276 | Link | Oct. 23, 1945 |